March 17, 1970
R. STARMER
3,501,384
LOW PRESSURE DEGASSING OF FEED WATER IN
MULTI-STAGE FLASH EVAPORATORS
Filed Dec. 15, 1966
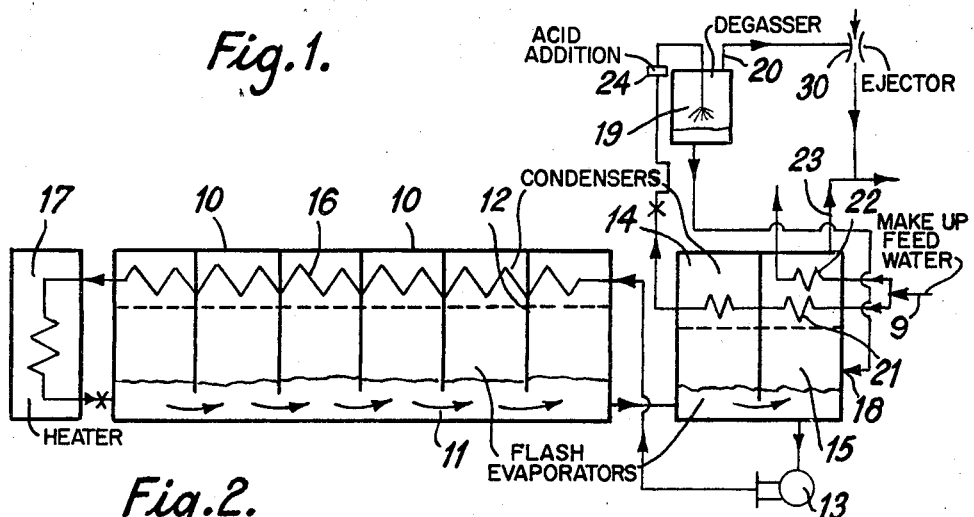
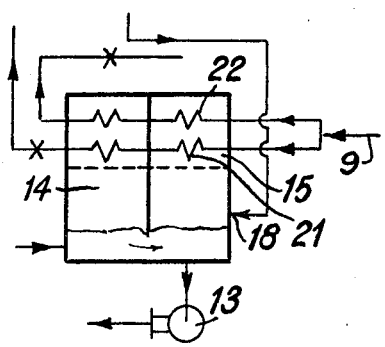
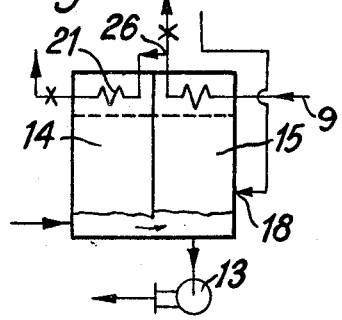
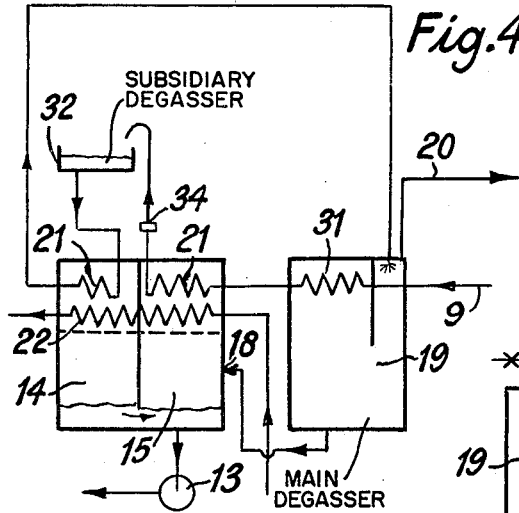
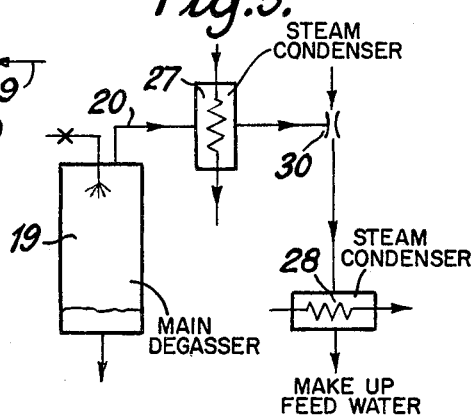

United States Patent Office 3,501,384
Patented Mar. 17, 1970

3,501,384
LOW PRESSURE DEGASSING OF FEED WATER IN MULTI-STAGE FLASH EVAPORATORS
Roy Starmer, Peterlee, County of Durham, England, assignor to Applied Research and Engineering Limited, Peterlee, County of Durham, England, a British company
Filed Dec. 15, 1966, Ser. No. 601,960
Claims priority, application Great Britain, Dec. 21, 1965, 54,157/65
Int. Cl. B01d 3/06, 3/10; C02b 1/06
U.S. Cl. 203—11                                        1 Claim

ABSTRACT OF THE DISCLOSURE

A multi-stage flash evaporator in which heated water to be evaporated is passed through a succession of flash chambers, make-up feed water is mixed with a least some of the water remaining in one of the cooler stages and the water mixture is fed in contra flow heat exchange relation with vapour from water passing through the flash chambers and with additional heating to the first stage, is provided with a degasser for the make-up feed water, means for heating the make-up feed water before it passes through the degasser and means for maintaining the pressure in the degasser lower than that of the stage of the evaporator at which the make-up feed water is added.

---

This invention relates to multi-stage flash evaporators employed in distillation plants for the production of distilled or potable water from sea-water or brackish water.

More specifically the invention relates to multi-stage flash evaporators of the kind in which heated water to be evaporated is passed through a succession of flash chambers, make-up feed water is mixed with the water remaining in the last or nearly the last stage, or some of it, and the water mixture is fed in contra flow heat exchange relation with vapour from water passing through the flash chambers and with additional heating to the first stage. Such evaporators will hereinafter be termed "of the kind described." It is desirable that the make-up feed water is treated before use to minimise the scaling of the evaporator plant. Such treatment may comprise injecting acid (e.g. sulphuric acid) into the water to reduce its alkalinity. However, the reaction of the acid and the water produces carbon dioxide gas and it is desirable to remove as much as possible of this gas, and any other dissolved gases, before the water is passed through the evaporator.

According to the invention, a multi-stage flash evaporator of the kind described is provided with a degasser for the make-up feed water, means for heating the make-up feed water before it passes through the degasser and means for maintaining the pressure in the degasser lower than that of the stage of the evaporator at which the make-up feed water is added.

Preferably the means for maintaining the lower pressure of the degasser comprise a vacuum pump, which may be, for example, an ejector or other vacuum pump. The output of the vacuum pump is preferably connected to a vent line from the stage of the evaporator to which the make-up feed water is added whereby the discharge of the pump from the degasser is related to the pressure of that stage of the evaporator.

In one form of the invention the temperature of the make-up feed water and the pressure in the degasser are such that vapour is flashed off in the degasser.

In flash evaporators of the kind described it is usual to employ, as means for condensing the vapour evolved in the last stage, cooling water, and it is common to extract from the cooling water, after it has been heated by the vapour, a proportion which is used as the feed or make-up feed. In one form of the present invention, the make-up feed water is used separately as means for condensing the vapours evolved in one or more stages (e.g. the last two stages), with or without additional cooling of the vapours in other ways, and the make-up feed water heated in this way is fed to the degasser after additional heating if desired. In another form of the invention the cooling water and the make-up feed water are used together for condensing the vapours evolved in one or more stages of the evaporator (e.g. the last stage), the make-up feed water then being separated from the cooling water and used as means for condensing the vapours evolved in another stage or stages of the evaporator (e.g. the last but one stage) whereby the make-up feed water is further heated before it is passed to the degasser.

In yet another form of the invention the make-up feed water, before it is fed to the degasser, is used as means for condensing the vapours evolved in one or more stages of the evaporator (e.g. the last stage), whereby the water is heated, is fed to a subsidiary degasser, and then is further heated by being used for condensing the vapours evolved in one or more stages of the evaporator (e.g. the last but one stage). In this case, the make-up feed water is preferably chemically treated to reduce its alkalinity before it is fed to the subsidiary degasser.

In any of the above forms of the invention, the make-up feed water may be at least partially heated, before it is passed to the degasser, by using it as means for condensing the vapours evolved in the degasser.

The invention also includes a method of removing gas from the make-up feed water of an evaporator of the kind described which method comprises heating the make-up feed water, passing it first through a degasser and then into a stage of the evaporator (e.g. the last stage) and operating the degasser at a pressure which is lower than the pressure of that stage of the evaporator.

In one form of the invention the pressure in the degasser is reduced by an ejector or other vacuum pump, the temperature of the make-up feed water and the pressure in the degasser being such that vapour is flashed-off in the degasser.

By way of example, an evaporator and its method of operation in accordance with the invention will now be described with reference to the accompanying diagrammatic drawings in which:

FIGURE 1 is a view of the evaporator incorporating one arrangement for treating the make-up feed water before it is passed into the degasser and an ejector for reducing the pressure in the degasser;

FIGURE 2 is a view of a second arrangement for heating the make-up feed water before it is passed to the degasser;

FIGURE 3 is a view of a third arrangement for heating the make-up feed water before it is passed to the degasser;

FIGURE 4 is a view of a fourth arrangement for heating the make-up feed water before it is passed to the degasser; and FIGURE 5 shows a modification which includes two steam condensers, one on either side of the ejector.

With reference to FIGURE 1, a multi-stage flash evaporator is supplied with a stream of feed water which is cascaded through the stages 10 in turn by means of an orifice 11 in the dividing wall 12 between each stage. Part of this feed water is provided by the water that does not flash in any of the stages and this water is passed back into the evaporator by means of a pump 13, which water is first passed through the condensation tubes 16 of each stage except, in this example, the last two stages 14, 15, whereby it is partially heated to the desired temperature by the vapour evolved in the stages of the evaporator, and then further heated by a heater 17. The other part of the feed water is a fresh supply which is, in this example, fed into the last stage 15 of the evaporator, at point 18, and then circulated by the pump 13 with the water already in the evaporator as just described.

In order to minimise corrosion and increase the efficiency of the evaporator, it is desirable to remove as many of the dissolved gases in the make-up feed water (i.e. the fresh supply) as soon as possible and it is also desirable to treat this feed water by, for example, injecting the water with sulphuric acid to reduce the alkalinity to about or below 30 p.p.m. when expressed as calcium carbonates. The result of this treatment is the formation of carbon dioxide and as much as possible of this gas and the other dissolved gases is removed by a degasser 19 before it is passed into the last stage of the evaporator. The vapour evolved in the degasser, which vapour will comprise the unwanted gases, will pass out of the degasser through a vent line 20. The vapour will also comprise steam, as will be later described. The make-up feed water is then fed by gravity or by a pump (not shown) to the point 18 at which it enters the last stage 15 of the evaporator.

With reference to the arrangement shown in FIGURE 1, before the make-up feed water enters the degasser 19 it is passed through the condensing tubes 21 of the last two stages 14, 15 of the evaporator whereby it is heated. The make-up feed water is also passed through the inlet conduit 9 to the condensing tubes 21 independently of an additional quantity of cooling water which is passed through a further set of condensing tubes 22 in the last stage 15 of the evaporator. However, since both the output of the evaporator and the temperature of the water passed to the degasser are variable, the pressure in the degasser will vary. To overcome this problem, the pressure in the degasser is maintained at a lower pressure than that of the last stage of the evaporator so that the feed water will degas. Also, the temperature of the water passing through the degasser may be sufficiently high for vapour to flash-off, in which case the vapour will comprise, in addition to dissolved gases, steam. These gases and any steam will be passed through the vent line 20. The means provided for maintaining this lower pressure is, in this example, an ejector 30 located in the vent line 20. The output side of the ejector is connected to a further vent line 23 which leads from the last stage of the evaporator to extract the unwanted gases therefrom. These gases are gases that have not been removed by the degasser and are evolved in one or other of the stages of the evaporator and then cascaded, under lower pressure, to the last stage 15.

It is not, of course, essential that the output of the ejector is connected to the vent line 23, for example, the ejector may be caused to discharge at some intermediate or even atmospheric pressure. However, the advantage of connecting the ejector output to the vent line 23 is that the temperature of the feed water in the degasser is dependent on the pressure and, therefore, the temperature of the vapour in the last stage 15. The duty or discharge pressure of the ejector is thus related to the temperature of the water passed through the degasser and ensures a very wide range of operation.

It is also not essential that the water passed through the degasser is first injected with sulphuric acid. However, such a step is desirable and would normally be carried out at a point 24 just prior to the degasser.

With reference to FIGURE 2, the arrangement is such that the additional quantity of cooling water that is passed through the condensing tubes 22 in the last stage 15 of the evaporator is also passed through condensing tubes in the preceding stage 14.

On the other hand, in FIGURE 3, the arrangement is such that the make-up feed water and the cooling water for the last stage of the evaporator are not separated until after they have been passed, together, through the last stage of the evaporator. At the point 26, the make-up feed water for the evaporator is tapped from the cooling water, passed through the condensing tubes 21 in stage 14 of the evaporator and then fed to the degasser 19.

With reference to FIGURE 4, the make-up feed water, which is heated by passing it through the condensing tubes 21, is also pre-heated by first passing it through condensing tubes 31 in the degasser 19. This arrangement also includes a further difference in that the water passed through the condensing tubes 21 in the last stage 15 of the evaporator is treated chemically at point 34 with sulphuric acid and then fed into a subsidiary degasser 32 before it is returned to the condensing tubes 21 in the last but one stage 14 of the evaporator for further heating and from which tubes the water is passed into the main degasser 19. The subsidiary degasser 32 operates at atmospheric pressure.

As described above, the vapour evolved from the water in the degasser 19 comprises steam in addition to the gases that it is desired to remove. This steam, or at least a part of it, will be drawn along the vent line 20 by the ejector 30.

In FIGURE 5 there is shown a modification which employs a steam condenser 27 located in the vent line 20 intermediate the degasser 19 and the ejector 30. The condensate produced is passed to waste. A further steam condenser 28 is also employed in the output of the ejector. The condensate from the condenser 28 may be used as additional make-up feed water for the evaporator.

The invention is not restricted to the specific details of the evaporator as described above. For example, the make-up feed water, having been passed through the degasser 19, may be fed into some other stage of the evaporator other than the last stage 15, the pressure in the degasser being maintained at a pressure that is lower than the pressure in that stage.

We claim:
1. In a method of removing gas from the make-up feed water of an evaporator of the kind in which heated water to be evaporated is passed through a succession of flash chambers, make-up feed water is mixed with at least some of the water remaining in one of the last of the succession of flash evaporation chambers and the water mixture is fed in heat exchange relation with vapor from water passing through the flash chambers and with additional heating to the first stage of the succession of flash chambers, the improvement which comprises heating the make-up feed water by passing it through at least one stage in heat exchange relation with the vapor, then passing the heated make-up feed water through a degasser and then into the flashing section of the same stage of the flash evaporator through which the make-up feed-water has first been passed in heat exchange relation and operating the degasser at a pressure which is lower than the pressure of said same stage of the evaporator so that vapor in the degasser is flashed off.

References Cited

UNITED STATES PATENTS

| 2,759,882 | 8/1956 | Worthen et al. | 203—11 |
| 3,105,020 | 9/1963 | Silver et al. | 202—173 X |
| 3,119,752 | 1/1964 | Checkovich | 203—173 X |
| 3,218,241 | 11/1965 | Checkovich | 203—11 X |
| 3,257,290 | 6/1966 | Starmer | 203—11 X |
| 3,259,552 | 7/1966 | Goeldner | 202—173 X |
| 3,300,392 | 1/1967 | Ross et al. | 203—11 X |
| 3,344,041 | 9/1967 | Wulfson | 202—173 X |
| 3,351,120 | 11/1967 | Goeldner et al. | 202—174 X |

WILBUR L. BASCOMB, Jr., Primary Examiner

U.S. Cl. X.R.

203—7, 88, 78, 80, 35, 99; 202—173, 176, 180, 182, 186